April 28, 1942.  W. J. PETERS ET AL  2,281,246
METHOD OF MAKING BEARINGS
Filed Feb. 5, 1940  2 Sheets-Sheet 1
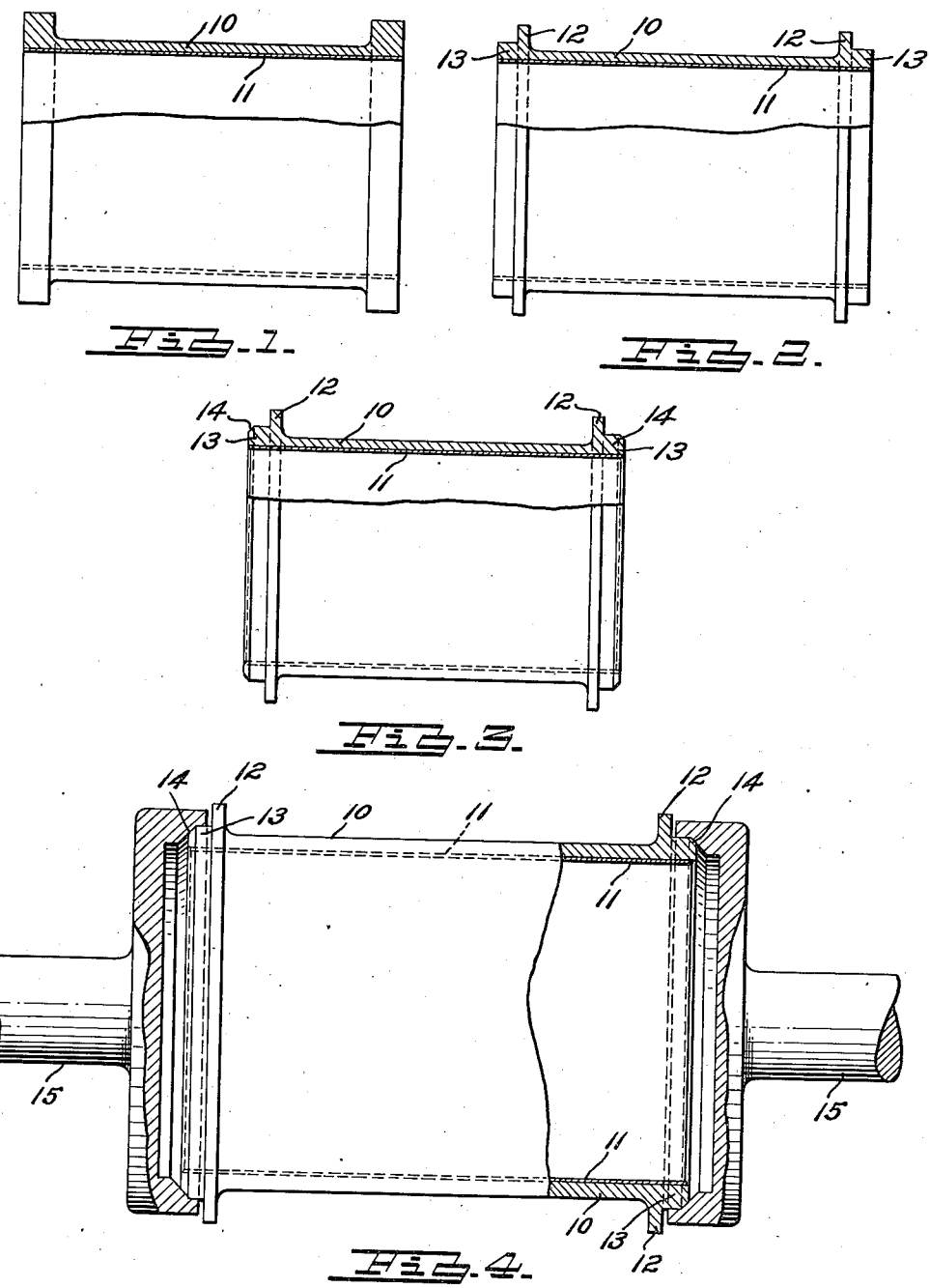
INVENTORS
William J. Peters
Wayne Pattison
BY
Ramsey, Kent, Chisholm + Lutz April 28, 1942.   W. J. PETERS ET AL   2,281,246
METHOD OF MAKING BEARINGS
Filed Feb. 5, 1940   2 Sheets-Sheet 2
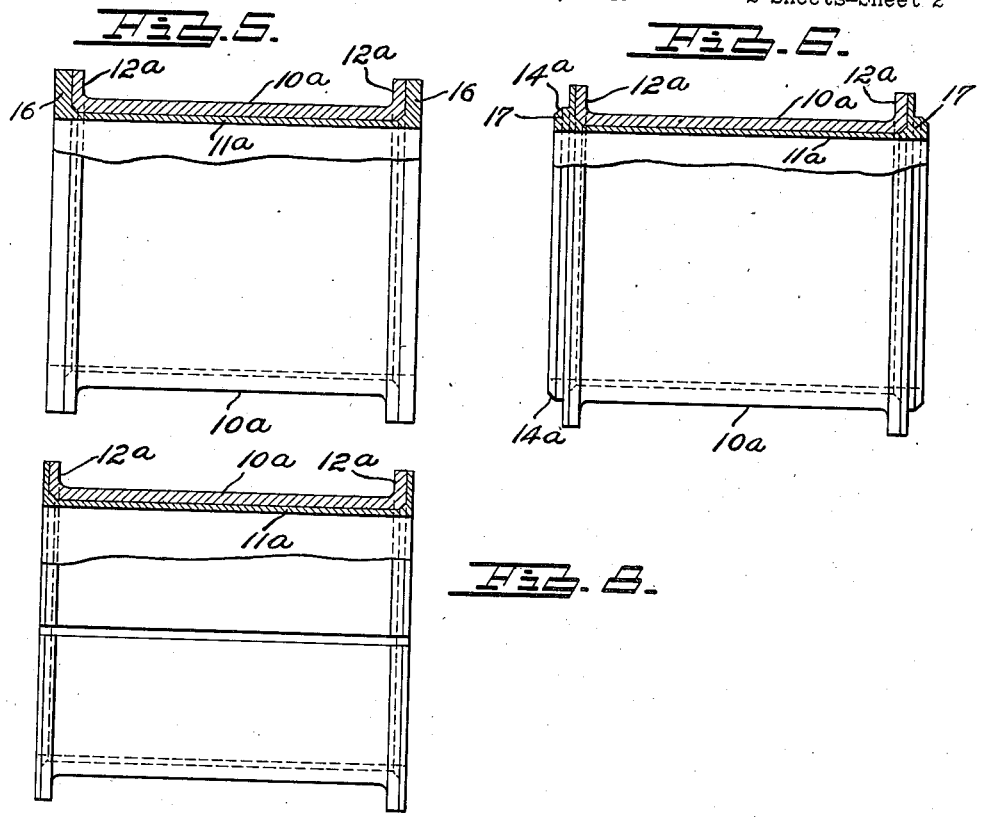
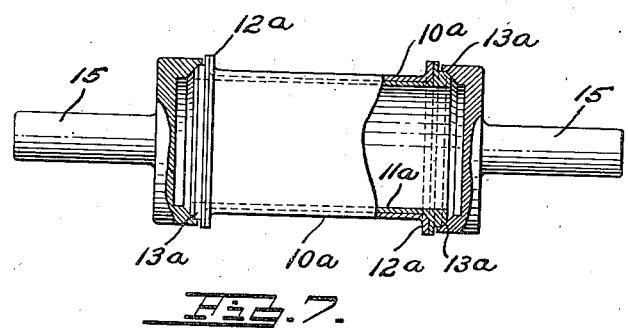
INVENTORS
William J. Peters
Wayne Pittison
BY
Ramsey, Kent, Chisholm & Lutz
ATTORNEY.

Patented Apr. 28, 1942

2,281,246

UNITED STATES PATENT OFFICE 2,281,246

METHOD OF MAKING BEARINGS

William J. Peters and Wayne Pattison, Detroit, Mich., assignors to Bohn Aluminum & Brass Corporation, Detroit, Mich., a corporation of Michigan Application February 5, 1940, Serial No. 317,284

7 Claims. (Cl. 29—149.5)

This invention relates to a method of making bearings, particularly bearings of the kind in which an outer supporting shell has flanges at its ends, and a layer of bearing metal is cast over the interior of the shell.

A particular object of the invention is to provide a method of manufacture by which the bearings can be more accurately finished. This object is accomplished by holding and aligning the bearing by contact with formations on the ends of the bearing while the outer circumference of the shell is being finished. The bearings are initially formed with end flanges of greater width than are to be present in the finished bearing, and material is removed from the end faces of these flanges to form collars which carry the holding formations or chamfers. In some cases the invention is carried out by forming the collars on part of the bearing metal which extends over the end of the bearing. The collars which carry the chamfers may be subsequently removed if desired.

These and other objects and advantages of the invention will become apparent as the description proceeds. While a preferred form of the method is disclosed herein for purposes of illustration, it should be understood that various changes may be made in the method without departing from the spirit of the invention as herein set forth and claimed.

In the drawings:

Fig. 1 is an elevation partly in section of a bearing in an initial stage of the process.

Fig. 2 is a view similar to Fig. 1 but shows the bearing after a facing cut has been taken into the end flanges.

Fig. 3 is a view similar to Fig. 2 but after the outer corners at the ends of the bearing have been chamfered.

Fig. 4 is a perspective partly in section showing the bearing of Fig. 3 being held in chucks.

Figs. 5, 6 and 7 are similar to Figs. 1, 3 and 4 respectively, but showing the application of the invention to a different type of bearing.

Fig. 8 is a view similar to Fig. 5 but illustrating the finished bearing.

Referring to the drawings more particularly, numeral 10 indicates the supporting shell of a bearing which is usually made of steel or some other suitably strong and rigid material and which is cylindrical in shape. 11 indicates the layer of bearing metal which is cast by any preferred method on the inner wall of shell 10. Out-turned flanges 12 are formed at the ends of the shell 10. These flanges 12 in the condition illustrated in Fig. 1 are flush with the outer ends of the bearing and extend inwardly a considerable distance so that, as originally formed, they are wider than required in the finished bearing.

In carrying out the method of this invention, the inner diameter of the bearing is first rough-bored and the bearing is then chucked against the inner bore, while facing cuts remove some of the shell metal from the end faces of the flanges 12, reducing them to the thickness illustrated in Fig. 2 and forming collars 13. The outer corners at the ends of the bearing are then chamfered, reducing the bearing to the shape illustrated in Fig. 3 with the chamfered ends 14.

In the next operation, chucks 15 support and center the bearing by engagement solely with the chamfers 14. The machine in which the chucks are mounted is not illustrated because it may be of any well-known construction, and while the bearing is thus supported, the outer surfaces of the shell 10 are finished to an accurate cylindrical contour. The finished bearing may be left in the general shape illustrated in Fig. 3, or other subsequent finishing operations may be applied to it.

Some bearings are designed so as to have a layer of bearing metal extend over the ends of the bearing, and in this case the parts for holding and aligning the bearing may be formed on the bearing metal as illustrated in Figs. 5 to 8 inclusive.

In this form of the invention the flanges 12ª are located at the ends of the steel shell 10, and the bearing layer 11ª has parts 16 which extend over the end faces of the flanges 12ª. The parts 16 are of greater width than is desired for the final covering over the flanges 12ª, thus providing surplus metal for carrying the holding parts.

In applying the method to this bearing the inner diameter is rough-bored and the bearing is then chucked on the inner diameter while facing cuts remove part of the bearing metal at the ends of the bearing, leaving projecting collars 17 which are subsequently beveled to form the chamfers 14ª. Fig. 7 shows the chucks 15 engaging the chamfered surfaces 14ª while the outer surfaces of the bearing are finished as described above.

The end collars carrying the camfered surface may, of course, be subsequently removed, and this is usually done with the bearing of Fig. 7, leaving the bearing in the final form shown in Fig. 8. The bearing may, of course, be cut into two semi-cylindrical halves as is well-known in the art.

We claim:

1. The method of finishing bearings having a shell formed of strong backing material lined with a layer of bearing material which comprises: initially forming the bearing with out-turned end flanges of greater width axially of the bearing than are to be present in the finished bearing, rough boring the inner diameter of the bearing, chucking against the inner diameter, removing part only of the end faces of the flanges to produce terminal collars of less radius than the flanges, bevelling the outer corners of the collars to form chamfers, and engaging the chamfers with chucks to hold and center the bearing, and finishing the outside of the shell.

2. The method of finishing bearings having a shell formed of strong backing metal lined with a layer of bearing metal which comprises: initially forming the bearing with out-turned end flanges of the backing metal, said flanges being of greater width axially of the bearing than are to be present in the finished bearing, removing part only of the end faces of the flanges to produce terminal collars of less radius than the flanges, bevelling the outer corners of the collars to form chamfers, engaging the chamfers with chucks to hold and center the bearing, and finishing the outside of the shell.

3. The method of finishing bearings having a shell formed of strong backing metal lined with a layer of bearing metal which comprises: initially forming the bearing with out-turned end flanges of the backing metal, said flanges being of greater width axially of the bearing than are to be present in the finished bearing, rough boring the inner diameter of the bearing, chucking against the inner diameter, removing part only of the end faces of the flanges to produce terminal collars of less radius than the flanges, bevelling the outer corners of the collars to form chamfers, and engaging the chamfers with chucks to hold and center the bearing, and finishing the outside of the shell.

4. In the method of finishing bearings in which bearing metal is cast over the face of an outwardly extending flange on the end of a bearing shell; the improvement which comprises: casting a thick facing of bearing metal over the face of the flange, cutting away part only of the facing metal to produce a holding formation on the facing metal, and engaging the holding formation with a chuck to center the bearing while finishing the outside of the shell.

5. In the method of finishing bearings in which bearing metal is cast over the face of an outwardly extending flange on the end of a bearing shell; the improvement which comprises: casting a thick facing of bearing metal over the face of the flange, cutting away part only of the facing metal to produce a holding formation on the facing metal, engaging the holding formation with a chuck to center the bearing while finishing the outside of the shell, and subsequently removing the holding formation.

6. In the method of finishing bearings in which bearing metal is cast inside a bearing shell and over the faces of outwardly extending flanges on the ends of the shell; the improvement which comprises: casting a thick facing of bearing metal over the face of each flange, cutting away part only of the facing metal to form a shoulder on each of the facings, engaging the shoulders with chucks to center the bearing while finishing the outside of the shell, and subsequently removing the shoulder.

7. The method of finishing a bearing having a flanged shell with bearing metal covering the inside of the shell and the faces of the flanges, the steps which comprise: casting a layer of bearing metal on the inside of the shell and over the faces of the flanges, rough finishing the inner bore of the bearing, chucking the bearing by engaging the inner bore, forming shoulders on the bearing metal covering the faces of the flanges, beveling the shoulders, engaging the beveled surfaces with chucks to center the bearing, finishing the outside of the shell, and removing the shoulders, leaving a layer of bearing metal covering the faces of the flanges.

WILLIAM J. PETERS.
WAYNE PATTISON.